United States Patent [19]

Yukawa et al.

[11] Patent Number: 5,212,217
[45] Date of Patent: May 18, 1993

[54] ARTIFICIAL MARBLE FROM REACTIVE THERMOPLASTIC, MONOMER AND ANHYDRIDE

[75] Inventors: Nobuhiko Yukawa, Akashi; Terukuni Hashimoto, Itami; Katsuhiko Sakamoto, Kishiwada; Atsushi Motoyama, Suita, all of Japan

[73] Assignee: Nippon Shokubai Kagaku Kogyo Co., Ltd., Osaka, Japan

[21] Appl. No.: 552,874

[22] Filed: Jul. 16, 1990

Related U.S. Application Data

[63] Continuation of Ser. No. 276,916, Nov. 26, 1988, abandoned.

[30] Foreign Application Priority Data

Nov. 26, 1987 [JP] Japan .................................. 62-296046
Jul. 27, 1988 [JP] Japan .................................. 63-185574
Aug. 19, 1988 [JP] Japan .................................. 63-204732

[51] Int. Cl.$^5$ .......................... C08K 3/22; C08K 3/26; C08K 3/34; C08K 3/36
[52] U.S. Cl. ..................................... 523/434; 523/427; 523/433; 523/435; 523/457; 523/466; 523/467
[58] Field of Search ...................... 525/114, 122, 112; 523/427, 433, 434, 435, 457, 466, 467

[56] References Cited

U.S. PATENT DOCUMENTS

| | | | |
|---|---|---|---|
| 4,268,433 | 5/1981 | Sawatari et al. | 525/303 |
| 4,341,877 | 7/1982 | Das et al. | 523/402 |
| 4,864,002 | 9/1989 | Sheutz et al. | 525/241 |
| 5,023,284 | 6/1991 | Cheung et al. | 524/342 |

FOREIGN PATENT DOCUMENTS 0025178  3/1981  European Pat. Off. .
2389645  of 1978  France .

OTHER PUBLICATIONS

Chem. Abstract No. 163422P, p. 244, vol. 73, 1973, Figovskii, O. L.

*Primary Examiner*—Robert E. Sellers
*Attorney, Agent, or Firm*—Omri M. Behr; Matthew J. McDonald

[57] ABSTRACT

This invention is directed to a setting resin composition comprising (A) a radically polymerizable monomer, (B) a thermoplastic resin soluble or dispersible in said monomer (A), (C) an epoxy resin, (D) at least one polyfunctional carboxylic acid compound selected from said group consisting of polyfunctional carboxylic acids and anhydrides thereof, and (E) an inorganic filler and using said components in proportions such that, based on said amount of said radically polymerizable monomer (A) taken as 100 parts by weight, the amount of said thermoplastic resin (B) is in the range of 5 to 75 parts by weight, that of said epoxy resin (C) in the range of 10 to 100 parts by weight, that of said inorganic filler (E) in the range of 100 to 1,000 parts by weight, and that of said polyfunctional carboxylic acid compound (D) in the range of 0.5 to 4.0 equivalent weights per equivalent weight of said epoxy resin (C), wherein an acid anhydride group is assumed to be bifunctional, an artificial marble using the same and a method for the production of an artificial marble.

5 Claims, No Drawings

ARTIFICIAL MARBLE FROM REACTIVE THERMOPLASTIC, MONOMER AND ANHYDRIDE

This application is a continuation of application Ser. No. 07/276,916, filed Nov. 26, 1988, now abandoned.

BACKGROUND OF THE INVENTION

1. Field of the Invention

This invention relates to a resin composition for artificial marble. More particularly, it relates to a resin composition possessing excellent formability and permitting production of set articles of a marble-like appearance ideally usable as household utensils such as washstands and bathtubs and ornamental articles.

2. Description of the Prior Art

Heretofore, the practice of producing shaped articles having a marble-like appearance by mixing such radically polymerizable resins as unsaturated polyester resin and acrylic syrup with a varying filler, forming the resultant mixtures in a prescribed shape, and causing the shaped mixtures to set has been in vogue (U.S. Pat. No. 4,544,584, JP-A-50-107,045, and JP-A-52-129,722).

The compositions prepared by mixing radically polymerizable resins with a filler, however, have a disadvantage that since the shaped compositions lose volume during the course of setting, the articles to be formed of these compositions in any complicated shape unlike the simple shape of a plate are liable to sustain fractures and cracks and sacrifice the ease of mold release.

As a way of alleviating the shrinkage during the course of setting, the method which attains desired diminution of the shrinkage by preparing a resin composition comprising a radically polymerizable resin mixed in advance with a thermoplastic resin and causing the thermoplastic resin, during the course of setting, to induce phase separation or effervescence as a phenomenon to make up for loss of volume (U.S. Pat. No. 3,701,748) has been already known to the art. The polymerizable resin which is rendered less shrinkable by this method, however, has a disadvantage that the shaped article produced by setting the formed resin composition is opacified in whity shade and compelled to sacrifice the marble-like appearance endowed with transparency and suffer from loss of resistance to smearing.

An object of the present invention, therefore, is to provide a setting resin composition which permits production of shaped articles having a marble-like appearance endowed with transparency and exhibits high formability enough to prevent the articles formed in any complicated three-dimensional shape from sustaining fractures and cracks during the course of setting.

Another object of this invention to provide artificial marbles beautiful and rich in sensation of transparency enough to be used for production of such three-dimentional structures as washbowls and bathtubs and a method for the production of the artificial marble.

SUMMARY OF THE INVENTION

The objects described above are accomplished by a setting resin composition comprising (A) a radically polymerizable monomer, (B) a thermoplastic resin soluble or dispersible in the monomer (A), (C) an epoxy resin, (D) at least one polyfunctional carboxylic acid compound selected from the group consisting of polyfunctional carboxylic acids and anhydrides thereof, and (E) an inorganic filler and using these components in proportions such that, based on the amount of the radically polymerizable monomer (A) taken as 100 parts by weight, the amount of the thermoplastic resin (B) is in the range of 5 to 75 parts by weight, that of the epoxy resin (C) in the range of 10 to 100 parts by weight, that of the inorganic filler (E) in the range of 100 to 1,000 parts by weight, and that of the polyfunctional carboxylic acid compound (D) in the range of 0.5 to 4.0 equivalent weights per equivalent weight of the epoxy resin (C) (providing that the acid anhydride group is assumed to be bifunctional).

The objects are also accomplished by artificial marble obtained by forming the aforementioned setting resin composition in a prescribed shape and causing the formed resin composition to set.

Further these objects are accomplished by a method for the production of artificial marble, which method comprises mixing the aforementioned setting resin composition with a radical polymerization initiator, casting the resultant mixture in a mold, causing the mixture in the mold to undergo a radical polymerization reaction at normal room temperature or an elevated temperature until the mixture in the mold is set to an extent at least releasable from the mold, then removing from the mold the mixture now in a partly set state, and heating the mixture thereby promoting the setting reaction of the epoxy resin in the mixture and allowing the mixture to be thoroughly set.

EXPLANATION OF PREFERRED EMBODIMENT

The radically polymerizable monomer (A) to be used in the present invention is a monofunctional radically polymerizable monomer assuming a liquid state at normal room temperautre or a mixture of the monofunctional radically polymerizable monomer with a polyfunctional (meth)acrylate.

The monofunctional radically polymerizable monomers available for this invention include (meth)acrylic acids; (meth)acrylic esters such as methyl (meth)acrylates, ethyl (meth)acrylates, isopropyl (meth)acrylates, isobutyl (meth)acrylates, n-butyl (meth)acrylates, 2-ethylhexyl (meth)acrylates, and hydroxyethyl (meth)acrylates; and aromatic vinyl compounds such as styrene, alpha-methyl styrene, and p-methyl styrene, for example.

The term "polyfunctional (meth)acrylate" refers to a compound possessing at least two (meth)acryloyl groups in the molecular unit thereof. The polyfunctional (meth)acrylates available herein include ethylene glycol di(meth)acrylates, propylene glycol di(meth)acrylates, neopentyl glycol di(meth)acrylates, glycerol tri(meth)acrylates, trimethylolpropane tri(meth)acrylates, dipentaerythritol hexa(meth)acrylates, and bisphenol A di(meth)acrylates, for example.

The mixing ratio of the monofunctional radically polymerizable monomer and the polyfunctional (meth)acrylate in the radically polymerizable monomer (A) is preferable to be such that the amount of the polyfunctional (meth)acrylate is in the range of 0 to 400 parts by weight, based on 100 parts by weight of the monofunctional radically polymerizable monomer. If the amount of the polyfunctional (meth)acrylate is so large as to exceed 400 parts by weight, there ensues a disadvantage that the produced resin composition tends to undergo unduly heavy shrinkage during the course of setting and the article obtained after the setting tends to sustain fractures and crack. Particularly, the radically polymerizable monomer (A) prepared by mixing 100 parts by weight of a monofunctional radically polymerizable monomer preferably containing an aromatic vinyl compound with 5 to 80 parts by weight of a polyfunctional (meth)acrylate proves advantageous in that the resin composition consequently produced enjoys an addition to the rigidity increasing rate during the course of setting due to the radical polymerization reaction and permits a cut in the time of standing before release of the produced article from the mold.

The thermoplastic resin (B) to be used in this invention is required to be soluble or dispersible in the radically polymerizable monomer (A). The thermoplastic resins satisfying this requirement include polymethyl methacrylate, polystyrene, styrene-vinyl acetate type polymers, polyvinyl acetate, saturated polyester, polybutadiene, and isoprene type polymers, for example. Among other thermoplastic resins cited above, polystyrene and/or polymethyl methacrylate are particularly preferable because they permit production of cured articles high in transparency and fine in appearance. The thermoplastic resin is desired to have weight average molecular weight in the range of 3,000 to 400,000, preferably 6,000 to 200,000.

When the thermoplastic resin (B) to be used in the present invention possesses a functional group capable of reacting with the epoxy resin (C) or the polyfunctional carboxylic acid compound (D), the resin composition consequently produced is not opacified when it is set and the marble-like set article finally produced acquires a highly satisfactory appearance. The thermoplastic resins possessing a functional group capable of reacting with the epoxy resin (C) or the polyfunctional carboxylic acid compound (D) include those which contain at least one functional group selected from the class consisting of epoxy group, thioepoxy group, aziridine group, oxazoline group, and N-hydroxyalkylamide groups in the molecular unit thereof, for example. These thermoplastic resins can be synthesized by (1) a method which comprises causing a polymerizable monomer possessing in the molecular unit thereof a reactive group such as epoxy group, thioepoxy group, aziridine group, oxazoline group, or N-hydroxyalkylamide group to polymerize, when necessary, with other polymerizable monomer, (2) a method which comprises causing a compound containing in the molecular unit thereof the reactive group to react with a polymer possessing a group capable of reacting with the compound thereby introducing the reactive group into the polymer, or (3) a method which comprises causing a polymer containing in the molecular unit thereof a functional group incapable of reacting with the epoxy resin (C) or the polyfunctional carboxylic acid compound (D) to be converted by the conventional technique into a polymer containing in the molecular unit thereof the reactive group, for example.

The amount of the thermoplastic resin (B) to be used must be such that the formed resin composition, during the setting will avoid being opacified as by effervescence or phase separation. This amount is fixed in due consideration of the compatibility of the thermoplastic resin (B) with the radically polymerizable monomer (A). Generally, the thermoplastic resin (B) is used in an amount falling in the range of 5 to 75 parts by weight, preferably 10 to 40 parts by weight, based on 100 parts by weight of the radically polymerizable monomer (A). If the amount of the thermoplastic resin (B) to be used is less than 5 parts by weight, there arises a disadvantage that the produced resin composition tends to undergo unduly large shrinkage during the course of setting and the article produced by the setting tends to sustain fractures and cracks. Conversely if this amount exceeds 75 parts by weight, there is a disadvantage that the article produced by setting is opacified and prevented from acquiring a marble-like appearance and also tends to suffer from poor heat resistance.

The epoxy resin (C) to be used in this invention is a compound containing at least two epoxy groups in the molecular unit thereof and possessing a molecula weight of not less than 140. The epoxy resins satisfying this requirement include bisphenol A type epoxy resins, bisphenol F type epoxy resins, beta-methylepichloro type epoxy resins, novolak type epoxy resins, and cycloaliphatic epoxy resins such as cyclic oxirane type, glycidylether type, and glycidyl ester type epoxy resins, for example. These epoxy resins can be used either singly or in the form of a mixture of two or more members.

The epoxy resin (C) having an epoxy equivalent weight in the range of 70 to 250, preferably 120 to 220, and an average molecular weight in the range of 140 to 1,000, preferably 240 to 480, proves particularly preferable in that the produced resin composition can be set thoroughly without inducing opacification and the article produced by the setting excels in heat resistance and water resistance.

Optionally, this epoxy resin (C) may be used combination with such a reactive diluent as n-butylglycidyl ether, allyl-glycidyl ether, phenylglycidyl ether, or vinyl cyclohexene monoepoxide.

The amount of the epoxy resin (C) to be used is in the range of 10 to 100 parts by weight, preferably 30 to 70 parts by weight, based on 100 parts by weight of the radically polymerizable monomer (A). If the amount of the epoxy resin (C) to be used is less than 10 parts by weight, there is a disadvantage that the resin composition consequently obtained tends to udnergo unduly large shrinkage during the course of setting. Conversely if this amount exceeds 100 parts by weight, there arises a disadvantage that the resin composition tends to be set at a low rigidity increasing rate and the time of standing before release of the set resin composition from the mold tends to be elongated.

The term "polyfunctional carboxylic acid compound (D)" as used in this invention refers to a compound possessing at least two carboxylic acid group in the molecular unit and/or a anhydride thereof. This polyfunctional carboxylic acid compound (D) functions as a curing agent for the epoxy resin (C). The polyfunctional carboxylic acid compound (D) satisfying the requirment includes maleic acid, fumaric acid, succinic acid, phthalic acid, trimellitic acid, pyromellitic acid, tetrahydrophthalic acid, and adipic acids, and anhydrides of such acids, for example Such polyfunctional carboxyl group-containing polymers such as poly(meth)acrylic acids are also available.

When such a dicarboxylic acid anhydride as maleic anhydride or phthalic anhydride is used as the polyfunctional carboxylic acid compound (D), the production of artificial marble between the removal of the partly set resin composition from the mold and the completion of the setting can be carried out smoothly.

The amount of the polyfunctional carboxylic acid compound (D) to be used is in the range of 0.5 to 4.0 equivalent weights, preferably 0.8 to 3.0 equivalent weights, per equivalent weight of the epoxy resin (C), wherein the acid anhydride group is assumed to be bifunctional. If the amount of the polyfunctional carboxylic acid compound (D) to be used is less than 0.5 equivalent weight, there ensues a disadvantage that the set article to be finally obtained tends to sustain fractures and cracks and suffer from impairment of such physical properties as heat resistance. Conversely if this amount exceeds 4.0 equivalent weights, there arises a disadvantage that the set article is deficient in water resistance and weatherability.

Where the thermoplastic resin (B) to be used possesses two or more carboxylic groups capable of reacting with the epoxy resin (C), the equivalent weights of the carboxyl group-containing thermoplastic resin must be included in those of the polyfunctional carboxylic acid compound (D).

For the purpose of promoting the reaction of the epoxy resin (C) with the polyfunctional carboxylic acid compound (D), the resin composition may incorporate therein a small amount of such a promoting agent as a tertiary amine, a boric ester, a Lewis acid, or an organic metal compound Examples of the tertiary amine are triethanolamine, triethyl amine, tris-(dimethylaminoethyl)phenol, N-dimethyl benzyl amine, pyridine, etc. examples of the Lewis acid are boron trifluoride diethylether, titanium chloride, stannic chloride, etc.; and examples of the organic metal compound are dibutyltin dilaurate, zinc caprirate, potassium acetyl acetone, tetrabutyl titanate, ferocene, lithium benzoate, etc The promoting agent is used in an amount in the range of 0.01 to 10% by weight, preferably 0.1 to 5% by weight, based on total weight of the radically polymerizable monomer (A), the thermoplastic resin (B), the epoxy resin (C) and the polyfunctional carboxylic acid compound (D).

The inorganic filler (E) to be used in the present invention is generally any of the inorganic powders conventionally used in the art. The inorganic fillers answering the description include calcium carbonate, talc, clay, silica, alumina, quartz, and calcium silicate and such hydrates of metal oxides as aluminum hydroxide, magnesium hydroxide, and calcium hydroxide, for example.

Among other inorganic fillers (E), the hydrate of a metal oxide, particularly aluminum hydroxide, proves preferable in that the resin composition consequently prepared permits easy production of a flame-retarded set article possessing a transparent and beautiful marble-like appearance.

The amount of the inorganic filler (E) to be used is in the range of 100 to 1,000 parts by weight, preferably 200 to 700 parts by weight, based on 100 parts by weight of the radically polymerizable monomer (A). If the amount of the inorganic filler (E) to be used is less than 100 parts by weight, the set article is deficient in heat resistance and fails to acquire an imposing marble-like sensation. Conversely if this amount exceeds 1,000 parts by weight, there ensues a disadvantage that the resin composition acquires high viscosity such as to impair the operational efficiency of the forming and setting works.

In the preparation of the resin composition of the present invention, the order in which the components thereof are mixed is not critical This preparation may be attained, for example, by a procedure which comprises adding the thermoplastic resin (B), the epoxy resin (C), and the polyfunctional carboxylic acid compound (D) to the radically polymerizable monomer (A) and then allowing the inorganic filler (E) to be dispersed by vigorous stirring in the resultant mixed liquid When the coupling agent is used during this dispersion of the inorganic filler (E), there is derived an advantage that the set article obtained by the forming and setting works enjoys improvement in water resistance. The coupling agents available herein include gamma-methacryloxypropyl trimethoxy silane, gamma-glycidoxypropyl trimethoxy silane, vinyl triethoxy silane, vinyl triacetoxy silane, isopropyltriisostearoyl titanate, and isopropyl tri(dodecylbenzenesulfonyl)titanate, for example.

Artificial marble possessing a transparent and beautiful appearance is obtained by forming the setting resin composition in a stated shape and setting the formed resin composition.

The production of the artificial marble from the resin composition of the present invention is accomplished by mixing the resin composition with a radical polymerization initiator and then heating the resultant mixture thereby inducing a radical polymerization of the resin composition and promoting a setting reaction of the epoxy resin in the resin composition.

The method of this invention for the production of artificial marble from the resin composition will be described more specifically below.

First, the cavity surface of the mold is treated, when necessary, with a mold releasing agent. As the mold, any of the conventional molds used for the casting of an unsaturated polyester resin or a radically polymerizable syrup can be used without any modification., A resin mold made of FRP, a wooden mold, or a metallic mold made of aluminum, for example, may be used without any restriction Particularly, the mold is preferable to be constructed so as to permit control of its temperature of the mold because this construction allows the progress of the setting reaction to be regulated and consequenlty contributes to heightening the productivity.

Then, the resin composition is mixed with a radical polymerization initiator and, when necessary, further with a polymerization accelerator The kinds and amount of the radical polymerization initiator and radical polymerization accelerator are determined in due consideration of the pot life of the resultant mixture between the time the components are mixed and the time the resultant mixture is completely cast in the mold and the setting time between the work of casting and that of mold release As the polymerization initiator and the polymerization accelerator, those which are used conventionally for setting an unsaturated polyester resin or a radically polymerizing syrup can be used.

The radical polymerization initiators available herein include such peroxides as benzoyl peroxide, cyclohexanone peroxide, and methylethyl ketone peroxide, for example The polymerization accelerators available herein inclue organic metal salts and organic amines, for example. For the pot life of the mixture to be sufficient, the 10-hours half-life temperature is desired to be not lower than 50° C. If the 10-hours half-life temperature is lower than 50° C. the pot life is too short for the operational efficiency to be proper. Where the casting is carried out as in a line mixer by keeping continuous addition of the radical polymerization initiator to the mixture, the polymerization initiator to be used may possess a 10-hours half-life temperature of lower than 50° C.

The radical polymerization initiators having 10-hours half-life temperatures exceeding 50° C. include methylethyl ketone peroxide, methylisobutyl ketone peroxide, lauroyl peroxide, benzoyl peroxide, t-butyl peroxypivalate, t-butyl peroxy-2-ethylhexanoate, and t-butyl peroxyisobutyrate, for example, preferably t-butyl peroxy-2-ethylhexanoate, t-butyl peroxypivalate and benzoyl peroxide.

The amount of the radical polymerization initiator is in the range of 0.1 to 10.0 parts by weight, preferably 0.2 to 5.0 parts by weight, based on 100 parts by weight of the sum of the radically polymerizable monomer (A) and the thermoplastic resin (B). If the amount of the polymerization initiator is less than 0.1 part by weight, there is a disadvantage that the radical polymerization reaction proceeds slowly and the time of standing before the mold release is unduly long. Conversely, if this amount exceeds 10.0 parts by weight, there ensues a disadvantage that the radical polymerization proceeds violently and the set article tends to sustain fractures and cracks or to discolor in yellow.

Where the radical polymerization reaction is caused to proceed by using only a radical polymerization initiator and omitting the use of a polymerization accelerator, there is an advantage that the shaped artificial marble product to be finally obtained is colored only slightly and is excellent in weatherability and resistance to discoloration due to heat.

Then, the mixture of the resin composition with the radical polymerization initiator prepared as described above is cast in the mold mentioned above. The radical polymerization reaction of the mixture in the mold is induced by keeping the mold at normal room temperature or at an elevated temperature, preferably at a temperature properly selected above the level of 40° C. in consideration of the 10-hours half-life temperature of the radical polymerization initiator to be used. The heating of the mold may be accomplished by means of an oven adapted to accommodate the mold and apply heat thereto or a system adapted to circulate a heat medium around the periphery of the mold. The mixture in the mold is set by the radical polymerization reaction. It is held inside the mold until the mixture is set to a rigidity enough for the set mixture to be safely removed from the mold.

When the radical polymerization reaction is allowed to proceed preferentially and the reaction between the epoxy resin (C) and the polyfunctional carboxylic acid compound (D) is repressed to the fullest possible extent until the partly set formed article is ready for release from the mold, the unset epoxy resin (C) is enabled to manifest a plasticizer-like effect in alleviating the occurrence of inner stress due to the setting shrinkage to be induced in consequence of the progress of the radical polymerization reaction and preventing the formed article from sustaining fractures and cracks during the course of setting inside the mold.

The heating, therefore, is preferable to be effected at a temperature of not exceeding 120° C., more preferably falling in the range of 40° to 110° C., so as to keep the reaction between the epoxy resin (C) and the carboxylic acid compound (D) from proceeding. For the polymerization reaction to proceed efficiently at this temperature, the polymerization initiator to be used is desired to have a 10-hours half-life temperature of not higher than 110° C.

When the radical polymerization has proceeded sufficiently and the mixture in the mold has been set to an extent at least fit for removal from the mold, the formed mixture is removed from the mold. Generally, it is extremely difficult to control the radical polymerization reaction and enable the resin to be removed in a partly set state from the mold because the radical polymerization rate is high and the heat of reaction accelerates this reaction In accordance with this invention, the control of the radical polymerization is easily attained because the mixture in the mold retains its partly set state at the time the radical polymerization reaction is substantially completed throughout the entire volume of the mixture.

The partly set formed article removed from the mold is quite susceptible to creep under persistent stress because it contains the epoxy resin (C) of a low molecular weight and the polyfunctional carboxylic acid compound (D). The partly set formed article, when necessary, is fitted with a retainer adapted to prevent deformation and then heated to a temperature desirably more than 120° C., preferably in the range of 130° to 200° C., enough to induce the reaction between the epoxy resin (C) and the polyfunctional carboxylic acid compound (D) and promote the setting reaction of the epoxy resin and allow the partly set formed article to set completely acquire ample rigidity for artificial marble.

The artificial marble obtained as described above, when necessary, is cut and ground by way of a finishing work and then put to use.

Now, the present invention will be described more specifically below with reference to working examples Wherever the word "parts" is mentioned, it is invariably meant a "parts by weight".

EXAMPLE 1

In a mixed liquid comprising 40 parts of styrene and 10 parts of trimethylol propane triacrylate, 25 parts of polystyrene (produced by Showa Denko Kabushiki Kaisha and marketed under trademark designation of "Esbright T-2 Beads") was dissolved. The resultant solution was uniformly mixed with 21 parts of bisphenol A type epoxy resin having an epoxy equivalent weight of 185 (produced by Ciba Geigy AG and marketed under trademark designation of "Araldite GY-250") and 4 parts of maleic anhydride Then, the resultant mixture was further mixed with 200 parts of aluminum hydroxide (produced by Showa Denko Kabushiki Kaisha and marketed under trademark designation of "Higilite H-320") to produce a resin composition (1) of the present invention.

This resin composition (1) was mixed with 1 part of a radical polymerization initiator having a 10-hours half-life temperature of 74° C. (Kayaku-Nully Kabushiki Kaisha and marketed under trademark designation of "Kayaester O").

Separately, a washbowl-forming FRP mold measuring 750 mm in length, 550 mm in width, and 130 mm in depth and having a cavity surface treated with a mold-releasing agent was heated to 60° C.

When this mold was filled with the mixed liquid obtained by mixing the resin composition (1) with the radical polymerization initiator and held for 60 minutes in an air bath kept at 65° C., a radical polymerization reaction of the mixture in the mold proceeded to an extent such the mixture was set enough for release from the mold. At this point, the formed washbowl was removed from the mold, fitted fast in a retainer, left standing for four hours in an air bath at 160° C. to induce and promote a setting reaction of the epoxy resin Consequently, there was obtained a finished washbowl having a translucent marble-like appearance. It was free from fracture or crack.

The shaped product possessed a linear shrinkage of 0.4% relative to the mold size and a total light transmittance of 20% at 6 mm in thickness. By the method of ASTM D-648, the heat distorsion temperature of the formed product was found to be 92° C.

EXAMPLE 2

In a mixed liquid comprising 50 parts of styrene and 5 parts of trimethylol propane trimethacrylate, 10 parts of polymethyl methacrylate (produced by Sumitomo Chemical Co., Ltd and marketed under trademark designation of "Sumipex B(LG)") was dissolved. The resultant solution was uniformly mixed with 27.5 parts of a bisphenol A type epoxy resin having an epoxy equivalent weight of 185 (produced by Ciba Geigy AG and marketed under trademark designation of "Araldite GY-250") and 7.5 parts of maleic anhydride Then, the resultant mixture was further mixed with 250 parts of aluminum hydroxide (produced by Showa Denko Kabushiki Kaisha and marketed under trademark designation of "Higilite H-341") to obtain a resin composition (2) of this invention.

A washbowl having a translucent marble-like appearance was obtained by following the procedure of Example 1, except that the resin composition (2) was mixed with 0.8 part of a radical polymerization initiator having a 10-hours half-life temperature of 56° C. (produced by Kayaku-Nully kabushiki Kaisha and marketed under trademark designation of "kayaester P-70") and the radical polymerization reaction of the mixture in the mold was carried out at 55° C. for 50 minutes. This formed product was free from fracture and crack and possessed a linear shrinkage of 0.3% and a total light transmittance of 20% at a thickness of 6 mm. The heat distorsion temperature of this product was 105° C.

EXAMPLE 3

In a mixed liquid comprising 20 parts of styrene, 20 parts of methyl methacrylate, and 10 parts of trimethylol propane triacrylate, 20 parts of polystyrene (produced by Showa Denko Kabushiki Kaisha and marketed under trademark designation of "Esbright T-2 Beads") was dissolved. The resultant solution was uniformly mixed with 25 parts of an alicyclic epoxy resin having an epoxy equivalent weight of 138 (produced by Ciba Geigy AG and marketed under trademark designation of "Araldite CY-179") and 5 parts of maleic anhydride. Then, the resultant mixture was further mixed with 150 parts of magnesium hydroxide (produced by Tateho Kagaku Kabushiki Kaisha and marketed under trademark designation of "Magster No. 10"), to obtain a resin composition (3) of this invention.

A finished washbowl having a translucent marble-like appearance was obtained by following the procedure of Example 1, except that the resin composition (3) was mixed with 1 part of a radical polymerization initiator having a 10-hours half-life temperature of 105° C. (produced by Kayaku-Nully Kabushiki Kaisha and marketed under trademark designation of "Kayameck A") and the radical polymerization reaction was carried out at 95° C. for 80 minutes. The formed product was free from fracture and crack and possessed a linear shrinkge of 0.5% and a total light transmittance of 14% at a thickness of 6 mm. The heat distorsion temperature of this product was 108° C.

EXAMPLE 4

A resin composition (4) of this invention was obtained by dissolving 5 parts of polymethyl methacrylate (produced by Sumitomo Chemical Co., Ltd and marketed under trademark designation of "Sumipex B(LG)") in a mixed liquid comprising 40 parts of styrene and 10 parts of ethylene glycol dimethacrylate, uniformly mixing the resultant solution with 35 parts of a bisphenol F type epoxy resin having an epoxy equivalent weight of 165 (produced by Ciba Geigy AG and marketed under trademark designation of "Araldite XPY 306") and 10 parts of phthalic anhydride and then mixing the resultant mixture further with 150 parts of magnesium hydroxide (produced by Tateho Kagaku Kabushiki Kaisha and marketed under trademark designation of "Magster No.10").

A finished washbowl having a translucent marble-like appearance was obtained by following the procedure of Example 1, except that the resin composition (4) was mixed with 0.5 part of a radical polymerization initiator having a 10-hours half-life temperature of 72° C. (produced by Kayaku-Nully Kabushiki Kaisha and marketed under trademark designation of "Kadox B") and the radical polymerization of the mixture in the mold was carried out at 80° C. for 60 minutes and the reaction of the epoxy resin in the formed mixture after removal from the mold was carried out at 180° C. for three hours. This formed product was free from fracture and crack and possessed a linear shrinkage of 0.5% and a total light transmittance of 14% at a thickness of 6 mm. The heat distorsion temperature of the product was 90° C.

EXAMPLE 5

A resin composition (5) of this invention was obtained by dissolving 10 parts of polymethyl methacrylate (produced by Sumitomo Chemical Co , Ltd. and marketed under trademark designation of "Sumipex B (LG)") in a mixed liquid comprising 50 parts of methyl methacrylate and 5 parts of ethylene glycol dimethacrylate, uniformly mixing the resultant solution with 20 parts of a bisphenol A type epoxy resin having an epoxy equivalent weight of 185 (produced by Ciba Geigy AG and marketed under trademark designation of "Araldite GY-250"), 5 parts of an alicyclic epoxy resin having an epoxy equivalent weight of 74 (produced by Chisso Corporation, and marketed under trademark designation of "Chissonox 206"), and 10 parts of phthalic anhydride, and then mixing the resultant mixture further with 100 parts of aluminum hydroxide (produced by Showa Denko Kabushiki Kaisha and marketed under trademark designation of "Higilite H-320").

A finished washbowl having a translucent marble-like appearance was obtained by following the procedure of Example 1, except that the resin composition (5) with 1 part of a radical polymerization initiator having a 10-hours half-life temperature of 78° C. (produced by Kayaku-Nully Kabushiki Kaisha and marketed under trademark designation of "Kayaester I") and the radical polymerization reaction in the mold was carried out at 65° C. for 60 minutes and the reaction of the epoxy resin after release from the mold was carried out at 140° C. for eight hours This formed product was free from fracture and crack and possessed a linear shrinkage of 0.7% and a total light transmittance of 11% at a thickness of 6 mm. The heat distorsion temperature of the product was 85° C.

EXAMPLE 6

A resin composition (6) of this invention was obtained by dissolving 15 parts of polystyrene (produced by Showa Denko Kabushiki Kaisha and marketed under trademark designation of "Esbright T-2 Beads") in a mixed liquid comprising 30 parts of styrene and 10 parts of trimethylol propane triacrylate, uniformly mixing the resultant solution with 25 parts of a bisphenol A type epoxy resin having an epoxy equivalent weight of 185 (produced by Ciba Geigy AG and marketed under trademark designation of "Araldite GY-250"), and 20 parts of maleic anhydride, and then mixing the resultant mixture further with 200 parts of aluminum hydroxide (produced by Showa Denko Kabushiki Kaisha and marketed under trademark designation of "Higilite H-320").

A finished washbowl having a translucent marble-like appearance was obtained by following the procedure of Example 1, except that the resin composition (6) was used instead. This formed product was free from fracture and crack and possessed a linear shrinkage of 0.4% and a total light transmittance of 20% at a thickness of 6 mm. The heat distorsion temperature of this formed product was 125° C.

Control 1

A resin composition (1) for comparison was obtained by following the procedure of Example 1, except that the epoxy resin and the maleic anhydride were not incorporated When the forming and the setting were carried out by following the procedure of Example 1 using the resin composition (1) for comparison, a washbowl consequently obtained sustained numerous fractures and cracks. Because of the flushing of the surface layer, the formed product possessed a whitish opaque appearance. It possessed a linear shrinkage of 2% and a total light transmittance of 3% at a thickness of 6 mm.

EXAMPLE 7

A flask provided with a stirrer, an inert gas inlet tube, a reflux condenser, and a thermometer was charged with 400 parts of deionized water having 0.2 part of polyvinyl alcohol dissolved in advance therein. A mixture prepared in advance by dissolving 1.0 part of benzoyl peroxide in a polymerizable monomer comprising 196 parts of styrene and 4 parts of isopropenyl oxazoline was added to the deionized water and stirred at a high speed to produce a homogeneous suspension. The suspension, with nitrogen gas kept blown therein, was heated to 80° C. and kept at this temperature and stirred for five hours to effect polymerization, and then cooled to produce a polymer suspension. This polymer suspension was filtered to separate a solid component. This solid component was washed and then dried to obtain a polymer having an oxazoline group as a reactive group [referred to as polymer (1)]. By the GPC measurement, the molecular weight, Mn and Mw, of this polymer (1) were found to be 58,000 and 150,000 respectively. A resin composition (7) of this invention was obtained by dissolving 25 parts of the polymer (1) in a mixed liquid comprising 40 parts of styrene and 10 parts of trimethylol propane triacrylate, then uniformly mixing the resultant solution with 21 parts of bisphenol A type epoxy resin having an epoxy equivalent weight of 185 (produced by Ciba Geigy AG and marketed under trademark designation of "Araldite GY-250) and 4 parts of maleic anhydride, and thereafter mixing the resultant mixture further with 200 parts of aluminum hydroxide (produced by Showa Denko K.K. and marketed under trademark designation of "Higilite H-320").

This resin composition (7) was mixed with 1 part of a radical polymerization initiator (produced by Kayaku-Nully Kabushiki Kaisha and marketed under trademark designation of "Kayaester O") The resultant mixture was cast in the same mold as used in Example 1 and left standing at 65° C. for one hour to undergo radical polymerization. A washbowl consequently formed was removed from the mold, fitted in a retainer, and left standing in an air bath at 160° C. for four hours to effect a setting reaction of the epoxy resin in the composition. Consequently there was obtained a finished washbowl having a translucent marble-like appearance.

This product was free from fracture and crack and possessed a linear shrinkage of 0.4% and a total light transmittance of 25% at a thickness of 6 mm. The heat distorsion temperature of this formed product was 98° C.

EXAMPLE 8

The same flask as used in Example 7 was charged with 400 parts of deionized water having 0.2 part of polyvinyl alcohol dissolved in advance therein. A mixture prepared in advance by dissolving 16 parts of benzoyl peroxide in a polymerizable monomer comprising 194.9 parts of styrene and 5.1 parts of glycidyl methacrylate was added to the deionized water and stirred at a high speed to produce a homogeneous suspension. The suspension, with nitrogen gas kept blown therein, was heated to 80° C. and kept at this temperature and stirred for five hours to induce a polymerization reaction and then cooled, to obtain a polymer suspension. This polymer suspension was filtered to separate a solid component. The solid component was washed and then dried to obtain a polymer possessing one epoxy group on the average as a reactive group in the molecular unit thereof (referred to as polymer (2)). By the GPC measurement, the molecular weight, Mn and Mw, of this polymer (2) were found to be 5,500 and 11,000 respectively.

A resin composition (8) of this invention was obtained by dissolving 10 parts of this polymer (2) in a mixed liquid comprising 40 parts of styrene and 10 parts of trimethylol propane triacrylate, uniformly mixing the resultant solution with 25 parts of a bisphenol A type epoxy resin having an epoxy equivalent weight of 185 (produced by Ciba Geigy AG and marketed under trademark designation of "Araldite GY-250") and 15 parts of maleic anhydride, and mixing the resultant mixture further with 250 parts of aluminum hydroxide (produced by Showa Denko Kabushiki Kaisha and marketed under trademark designation of "Higilite H-341").

When the forming and the setting were carried out by following the procedure of Example 7 using the resin composition (8), there was obtained a finished washbowl having a translucent marble-like appearance. This formed product was free from fracture and crack and possessed a linear shrinkage of 0.3% and a total light transmittance of 24% at a thickness of 6 mm. The heat distorsion temperature of this product was 160° C.

EXAMPLE 9

30 The same flask as used in Example 7 was charged with 400 parts of deionized water having 0.2 part of polyvinyl alcohol dissolved in advance therein. A mixture prepared in advance by dissolving 16 parts of benzoyl peroxide in a polymerizable monomer comprising 100 parts of methyl methacrylate, 94.3 parts of butyl acrylate, and 5.7 parts of 2,3-epithiopropyl methacrylate was added to the deionized water and stirred at a high speed to produce a homogenous suspension. The suspension, with nitrogen gas kept blown therein, was heated to 80° C., kept at this temperature and stirred for five hours to effect a polymerization reaction, and then cooled, to obtain a polymer suspension This polymer suspension was filtered to obtain a solid component The solid component was washed and then dried, to produce a polymer having one thioepoxy group as a reactive group on the average in the molecular unit thereof (referred to as polymer (3)). By the GPC measurement, the molecular weight, Mn and Mw, of this polymer were found to be 5,800 and 12,000 respectively.

A resin composition (9) of this invention was obtained by dissolving 10 parts of the polymer (3) in a mixed liquid comprising 45 parts of styrene and 10 parts of trimethylol propane triacrylate, uniformly mixing the resultant solution with 23 parts of a bisphenol A type epoxy resin having an epoxy equivalent weight of 185 (produced by Ciba Geigy AG and marketed under trademark designation of "Araldite GY-250") and 12 parts of maleic anhydride, and then mixing the resultant mixture further with 250 parts of aluminum hydroxide (produced by Showa Denko Kabushiki Kaisha and marketed under trademark designation of "Higilite H-320").

When the forming and the setting were carried out by following the procedure of Example 7 using the resin composition (9), there was obtained a finished washbowl having a translucent marble-like appearance. This formed product was free from fracture and crack and possessed a linear shrinkage of 0.3% and a total light transmittance of 30% at a thickness of 6 mm. The heat distorsion temperature of this product was 142° C.

EXAMPLE 10

The same flask as used in Example 7 was charged with 400 parts of deionized water having 0.2 part of polyvinyl alcohol dissolved in advance therein A mixture prepared in advance by dissolving 16 parts of benzoyl peroxide in a polymerizable monomer comprising 189.8 parts of styrene and 10.2 parts of glycidyl methacrylate was added to the deionized water and stirred at a high speed to produce a homogeneous suspension. Then, the suspension, with nitrogen gas kept blown therein, was heated to 80° C. and held at this temperature and stirred for five hours to induce a polymerization reaction, and then cooled to form a polymer suspension. This polymer suspension was filtered to separate a solid component. The solid component was washed and then dried to obtain a polymer having two epoxy groups as reactive groups on the average in the molecular unit thereof (referred to as polymer (4)). By the GPC measurement, the molecular weight, Mn and Mw, of this polymer (4) were found to be 5,500 and 10,000 respectively.

A resin composition (10) of this invention was obtained by dissolving 5 parts of the polymer (4) in a mixed liquid comprising 50 parts of styrene and 10 parts of trimethylol propane trimethacrylate, uniformly mixing the resultant solution with 23 parts of a bisphenol A type epoxy resin having an epoxy equivalent weight of 185 (produced by Ciba Geigy AG and marketed under trademark designation of "Araldite GY-250") and 12 parts of maleic anhydride, and then mixing the resultant mixture further with 250 parts of aluminum hydroxide (produced by Showa Denko Kabushiki Kaisha and marketed under trademark designation of "Higilite H-341").

When the forming and the setting were carried out by following the procedure of Example 7 using the resin composition (10), there was obtained a finished washbowl having a translucent marble-like appearance. This formed product was free from fracture and crack and possessed a linear shrinkage of 0.3% and a total light transmittance of 32% at a thickness of 6 mm. The heat distorsion temperature of this product was 130° C.

EXAMPLE 11

In the same flask as used in Example 7, 200 parts of toluene and 200 parts of methylisobutyl ketone were placed and, with nitrogen gas kept blown therein, heated to 80° C. To the stirred mixture, a mixture prepared in advance by dissolving 1.0 part of benzoyl peroxide in a polymerizable monomer comprising 190 parts of styrene and 10 parts of 2-(1-aziridinyl)ethyl methacrylate was added dropwise through a dropping funnel over a period of 2 hours The resultant mixture was continuously stirred for five hours to induce a polymerization reaction and then cooled, to obtain a polymer solution When 100 parts of the polymer solution was combined with 2,000 parts of methanol to induce reprecipitation and the precipitate was separated and dried, there was obtained a polymer (referred to as polymer (5)) having an aziridine group as a reactive group. By the GPC measurement, the molecular weight, Mn and Mw, of this polymer (5) were found to be 30,000 and 85,000 respectively.

A resin composition (11) of this invention was obtained by dissolving 3 parts of the polymer (5) in a mixed liquid comprising 30 parts of styrene, 20 parts of methyl methacrylate, and 5 parts of trimethylol propane triacrylate, uniformly mixing the resultant solution with 23 parts of a bisphenol A type epoxy resin having an epoxy equivalent weight of 185 (produced by Ciba Geigy AG and marketed under trademark designation of "Araldite GY-250"), and 12 parts of phthalic anhydride, and then mixing the resultant mixture further with 200 parts of aluminum hydroxide (produced by Showa Denko Kabushiki Kaisha and marketed under trademark designation of "Higilite H-341").

When the forming and the setting were carried out by following the procedure of Example 7, using the resin composition (11), there was obtained a finished washbowl having a translucent marble-like appearance. This formed product was free from fracture and crack and possessed a linear shrinkage of 0.4% and a total light transmittance of 25% at a thickness of 6 mm. The heat distorsion temperature of this product was 115° C.

EXAMPLE 12

In the same flask as used in Example 7, 460 parts of cyclohexane and 2 parts of Leodole SP-810 (product of Kao Co., Ltd.) were placed and, with nitrogen gas kept blown therein, heated to 75° C. To the hot mixture, a mixture prepared in advance by adding 140 parts of deionized water and 2 parts of ammonium persulfate to a polymerizable monomer comprising 60 parts of acrylamide, 15.2 parts of N-vinyl pyrrolidone, and 1.6 parts of N-hydroxyethyl methacrylamide was added dropwise over a period of 1.5 hours. The resultant mixture was continuously stirred for 0.5 hour to effect a polymerization reaction The resultant polymer was cooled, deprived of cyclohexane, and dried under a vaccum at a temperature of 80° to 100° C., to obtain a polymer possessing a N-hydroxyalkylamide group as a reactive group (referred to as polymer (6)). By the GPC measurement, the molecular weight, Mn and Mw, of this polymer (6) were found to be 12,000 and 34,000 respectively.

A resin composition (12) of this invention was obtained by following the procedure of Example 11, except that the polymer (6) was used in place of the polymer (5) of Example 11.

When the forming and the setting were carried out by following the procedure of Example 7 using the resin composition (12), there was obtained a finished washbowl having a translucent marble-like appearance. This formed product was free from fracture and crack and possessed a linear shrinkage of 0.4% and a total light transmittance of 28% at a thickness of 6 mm. The heat distorsion temperature of this product was 115° C.

EXAMPLE 13

A resin composition (13) of this invention was obtained by dissolving 10 parts of the polymer (2) of Example 8 in a mixed liquid comprising 27 parts of styrene, 18 parts of methyl methacrylate, and 10 parts of trimethylol propane triacrylate, uniformly mixing the resultant solution with 23 parts of a bisphenol A type epoxy resin possessing an epoxy equivalent weight of 185 (produced by Ciba Geigy AG and marketed under trademark designation of "Araldite GY-250") and 12 parts of maleic anhydride, and then mixing the resultant mixture further with 250 parts of aluminum hydroxide (produced by Showa Denko Kabushiki Kaisha and marketed under trademark designation of "Higilite H-320").

When the forming and the setting were carried out by following the procedure of Example 7 using the resin composition (13), there was obtained a finished washbowl possessing a translucent marblek-like appearance. This formed product was free form fracture and crack and possessed linear shrinkage of 0.3% and a total light transmittance of 30% at a thickness of 6 mm. The heat distorsion temperature of this product was 166° C.

Since the setting resin composition of this invention is free from such drawbacks as fractures and cracks which are possibly entailed by the shrinkage during the course of setting, it permits easy formation of articles of even complicated three-dimensional structures. Since it undergoes neither effervescence nor phase separation during the course of setting, it permits production of set articles which possess a marble-like appearance endowed with the sensation transparency and excel in resistance to smearing.

With the resin composition of the present invention, therefore, articles of three-dimensional structures such as washbowls and bathtubs which are required to abound with fine appearance can be produced with high effciency.

What is claimed is:

1. A setting resin composition comprising:
    (A) a radically polymerizable monomer in a liquid state at room temperature,
    (B) a least one thermoplastic resin selected from the group consisting of polystyrene and polymethyl methacrylate, containing in the molecular unit thereof at least one functional group selected from the group consisting of epoxy gruop, thioepoxy group, aziridine group, oxazoline group and N-hydroxyalkylamide group and having a weight average molecular weight in the range of 3,000 to 400,000,
    (C) an epoxy resin having an epoxy equivalent weight in the range of 70 to 250,
    (D) at least one carboxyic acid anhydride selected from the group consisting of maleic anhydride and phthalic anhydride, and
    (E) an inorganic filler and
    using said components in proportions such that, based on the amount of said radically polymericable monomer (A) taken at 100 parts by weight, the amount of said thermoplastic resin (B) is in the range of 5 to 75 parts by weight, that of said epoxy resin (C) in the range of 10 to 100 parts by weight, that of said inorganic filler (E) in the range of 100 to 1,000 parts by weight, and that of said carboxylic acid anhydride (D) in the range of 0.5 to 4.0 equivalent weights per equivalent weight of said epoxy resin (C), and (E) said inorganic filler being the hydrate of a metal oxide.

2. A composition according to claim 1, wherein said inorganic filler (E) is aluminum hydroxide.

3. A composition according to claim 1, wherein said radically polymerizable monomer (A) comprises a polyfunctional (meth)acrylate and an aromatic vinyl compound.

4. A composition according to claim 1, wherein based on the amount of said radically polymerizable monomer (A) taken as 100 parts by weight, the amount of said thermoplastic resin (B) is in the range of 10 to 40 parts by weight, that of said epoxy resin (C) in the range of 30 to 70 parts by weight, that of said inorganic filler (E) in the range of 200 to 700 parts by weight, and that of said carboxylic acid anhydride (D) in the range of 0.8 to 3.0 equivalent weights per equivalent weight of said epoxy resin (C), wherein the acid anhydride is assumed to be bifunctional.

5. A composition according to claim 1, wherein said thermoplastic resin (B) contains an epoxy group.

* * * * *